United States Patent [19]

Meri

[11] 3,731,008

[45] May 1, 1973

[54] CIRCUIT FOR ENERGIZING AND DE-ENERGIZING A RELAY TO CONTROL THE OPERATION OF A TAPE RECORDER

[75] Inventor: Kalju Meri, Maspeth, N.Y.

[73] Assignee: Electrospace Corporation, Bronx, N.Y.

[22] Filed: Apr. 9, 1971

[21] Appl. No.: 132,782

[52] U.S. Cl. ................179/100.2 S, 226/24, 226/43, 307/109, 317/151, 320/1

[51] Int. Cl. .........................G11b 15/06, G11b 27/24

[58] Field of Search .................179/100.2 S, 100.2 R, 179/100.2 MD; 307/109; 320/1; 226/24, 33, 42, 43; 317/151, 123

[56] References Cited

UNITED STATES PATENTS

| | | | |
|---|---|---|---|
| 3,583,617 | 6/1971 | Kosaka | 179/100.2 S |
| 3,323,230 | 6/1967 | Cooper | 179/100.2 S |
| 3,505,485 | 4/1970 | Andrews | 179/100.2 S |
| 3,434,725 | 3/1969 | Eibensteiner | 179/100.2 S |
| 3,319,860 | 5/1967 | Wooldridge | 320/1 |
| 2,941,124 | 6/1960 | Gams et al. | 317/123 |

*Primary Examiner*—Bernard Konick
*Assistant Examiner*—Alfred H. Eddleman
*Attorney*—Friedman & Goodman

[57] ABSTRACT

A circuit for energizing and de-energizing a relay to start and stop a tape recorder receiving an endless tape loop provided with an electrically conductive foil disposed on a portion thereof. The circuit includes a capacitor in series with the relay so that when an energizing member is activated, the capacitor which is initially charged is then discharged across the relay to start the tape recorder and thereby cause movement of the endless tape loop. When foil sensing contact members, associated with the capacitor, are engaged by the moving conductive foil of the endless tape loop, the capacitor which is recharged during operation of the tape recorder is again discharged to open the relay and thereby stop the tape recorder. The capacitor is disposed in the circuit to provide for the tape recorder starting in both conditions where the foil sensing contact members are engaged and are out of engagement with the conductive foil.

11 Claims, 2 Drawing Figures

KALJU MERI
INVENTOR
BY Friedman & Goodman
ATTORNEYS

CIRCUIT FOR ENERGIZING AND DE-ENERGIZING A RELAY TO CONTROL THE OPERATION OF A TAPE RECORDER

BACKGROUND OF THE INVENTION

This invention relates to a circuit for energizing and de-energizing a relay by discharging one and the same capacitor through a coil of the relay, both in the energizing and the de-energizing instances. One practical application of the circuitry of the present invention is association with a tape recorder embodied in a telephone answering apparatus of the type described in U.S. Pat. No. 3,501,592 granted to Herbert Waldman on Mar. 17, 1970.

The tape recorder of the above cited patent is provided with an endless tape loop including an electrically conductive foil disposed on a portion thereof. Mounted in close proximity to the tape loop is a switch post with a pair of contact members positioned thereon. When the endless tape loop completes its cycle of rotation, the conductive foil engages the switch post thereby bridging its contact members. This results in the de-energization of the drive relay and consequent curtailment of the endless tape loop drive means.

It should be especially noted at this point, that the de-energization of the drive relay of the cited patent, as aforementioned, is accomplished by completing a shorting path across the drive relay coil upon the bridging of the switch post contact members, according to the circuit illustrated in the cited patent. It is apparent, that due to the curtailment of the tape loop drive means coincident with the engagement of the conductive foil with the switch post, the possibility exists that the mobility of the tape loop will cease to continue, resulting in the conductive foil remaining engaged with the contact members of the switch post. Consequently, the coil of the drive relay will be maintained in a shorted position, precluding the possibility of its becoming re-energized on a subsequent cycle initiation.

While it is true that in the cited patent the possibility of the above-mentioned occurrence is discounted in reliance upon the inertia of the tape loop mobility, so that even after the tape drive means are disabled, the tape loop will continue to advance sufficiently so that its conductive foil portion will continue to move past the switch post, experience has since demonstrated that the stalling of the conductive foil against the switch post is a distinct possibility. Moreover, reliance on the inertia of the tape loop to continue to move beyond the switch post before coming to a complete halt, limits the length of the conductive foil so as not to exceed a specific critical length, for if this critical length is exceeded, the trailing edge of the conductive foil will then remain engaged with the switch post contact members, the inertia of the tape movement not withstanding.

SUMMARY OF THE INVENTION

The circuit of the present invention is associated with a tape recorder arrangement receiving an endless tape loop provided with an electrically conductive foil disposed on a portion thereof. The circuit includes an appropriate voltage source for initially charging a capacitor to a predetermined voltage level, the capacitor being in series with one coil terminal of a drive relay, energizing means to cause the capacitor to discharge across the relay coil to start the tape recorder whereby the capacitor is again charged, and foil sensing contact means associated with the capacitor for again discharging the capacitor to open the drive relay when the foil sensing contact means are engaged by the electrically conductive foil to thereby stop the tape recorder and movement of the tape loop thereon.

Accordingly, an object of the present invention is to provide a circuit for a tape recorder which overcomes the disadvantages of the prior art, particularly the shortcomings of the above cited patent.

Another object of the present invention is to provide a circuit wherein the initial engagement of the conductive foil with the switch post contact members results in the de-energization of the drive relay to stop the tape recorder.

A further object of the present invention is to provide a circuit wherein the engagement of the conductive foil with the switch post contact members in the stopped position as set forth above, does not preclude the re-energization of the drive relay.

A still further object of the present invention is to provide a circuit which does not limit the length of the conductive foil of the endless tape loop.

Yet another object of the present invention is to provide a circuit for energizing and de-energizing a drive relay by discharging one and the same capacitor through a coil of the drive relay both in the energizing and deenergizing instances.

An added object of the present invention is to provide a circuit that combines all the above-mentioned features with extreme economy and reliability.

BRIEF DESCRIPTION OF THE DRAWINGS

Having in mind the above and other objects that will be evident from an understanding of this disclosure, the invention comprises the devices, combinations and arrangements of parts as illustrated in the present preferred embodiment of the invention which is hereinafter set forth in such detail as to enable those skilled in the art readily to understand the function, operation, construction and advantages of it, when read in conjunction with the accompanying drawings, in which.

DESCRIPTION OF THE PREFERRED EMBODIMENT

Figure 1:
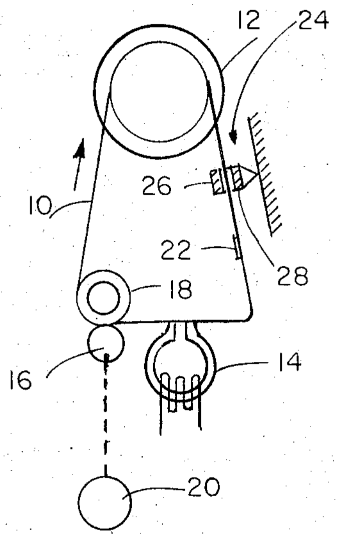
FIG. 1 represents a schematic representation of the announce tape loop and its drive associated with the present invention.

Referring to the drawings, FIG. 1 shows a schematic representation of announce drive means, similar to the type disclosed in the above cited U.S. Pat. No. 3,501,592, to which reference may be made for a more complete description thereof and for associated elements of the tape recorder. The numeral 10 designates a sound-carrier, such as a magnetic tape, and it is in the form of an endless loop, fed from and returned into a cartridge 12 of conventional design. The tape loop 10 is driven past a sound head 14 by means of a capstan 16 and pressure roller 18. The capstan 16 is driven in a conventional manner by a motor 20. The sound head 14 should be visualized as being equipped with the appropriate circuitry necessary to record and playback intelligence onto and from the tape loop 10. The details of this circuitry are of a conventional design and not essential for the understanding of the invention, and thus are not shown in the drawing.

A small portion 22 on the endless tape loop 10 is arranged to be electrically conductive. Any suitable and known means may be used to this end, for example, a small piece of metallic foil may be applied to this portion of the tape loop 10. Another example would be to coat the portion 22 with a paint of conductive silver. The conductive portion 22 is designed to engage with an electrical switch post 24 in the course of a cycle of the tape loop 10. The switch post 24 includes two conductive sections 26 and 28, each of which are insulated from each other. As the conductive portion 22 passes the switch post 24, the conductive portion 22 bridges section 26 to section 28 to activate the circuit of the present invention, both sections 26 and 28 being shown in the circuit of FIG. 2, the function of which will be set forth hereinafter below in more detail.

Figure 2:
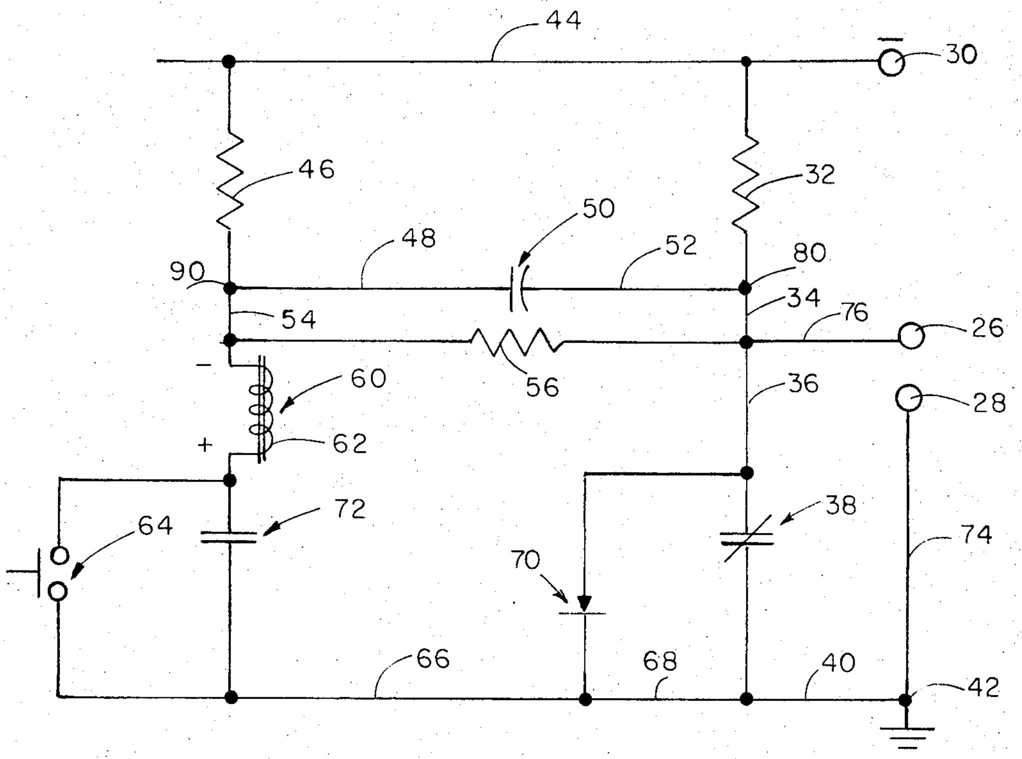
FIG. 2 represents an electrical circuit diagram pursuant to the present invention.

Reference is now made to the circuit diagram of FIG. 2. A voltage source at terminal 30 is connected by an electrical path including a resistor 32, a line 34, a line 36, conventional normally closed contacts 38 and a line 40, to a ground terminal 42. The resistor 32 is in parallel arrangement with an electrical branch including a line 44, a resistor 46 and parallel legs thereof including a first leg of line 48, a capacitor 50 and a line 52, and including a second leg of line 54, a resistor 56 and a line 34. When the circuit as described above, is in a quiescent state, a voltage is imposed across the capacitor 50. Consequently, the capacitor 50 builds up to this applied voltage. Preferably, the voltage at terminal 30 is −32 volts, so that the capacitor 50 in this arrangement builds up to 32 volts, with the capacitor 50 being positive at its terminal side connected to lead 52 as is evident from the disclosed circuit.

The circuit of FIG. 2 also includes a drive relay 60 provided with a relay coil 62 associated with the above-mentioned normally closed contacts 38. Energizing contacts 64, a line 66 and a line 68 are connected in series with the relay coil 62 between the capacitor 50 and the ground terminal 42. Both the energizing contacts 46 and the drive relay 60 are commercially available conventional types, wherein the drive relay 60 is of the polarized type and will operate only if a proper voltage polarity is applied with respect to the terminals of coil 62. When the energizing contacts 64 are operated in a conventional manner to close the contacts 64, a ground potential is applied to the positive terminal of the drive relay coil 62.

Accordingly, the capacitor 50 which has been initially charged as stated above, will now discharge across the relay coil 62, thereby energizing the drive relay 60. The discharge path of the capacitor 50 defines a circuit A as follows:

CIRCUIT A

Positive side of capacitor 50, line 52, line 34, line 36, normally closed contacts 38, line 68 which is connected to ground terminal 42 by line 40, line 66, energizing contacts 64, relay coil 62 of drive relay 60, line 54, and negative side of capacitor 50.

The above operation of the drive relay 60 causes the normally closed contacts 38 to open. To prevent the breaking or opening of the above-mentioned operating circuit path for the drive relay 60, as set forth in circuit A, a diode 70 is interposed in the circuit as shown in FIG. 2, in parallel arrangement with the normally closed contacts 38. By virtue of the fact that the voltage across the capacitor 50 is presently positive at its terminal side connected to line 52, the diode 70 will be conductive in this new arrangement of circuit A, and will serve to create an alternate path from the capacitor 50 to the ground terminal 42. Conventional normally opened contacts 72 associated with the drive relay 60, are provided to continue the operation of the drive relay 60 once the energizing contacts 64 are opened, as will be set forth hereinafter below. It is noted that the normally closed contacts 38 will open before the normally opened contacts 72 have a chance to close, whereby the diode 70 conducts to complete the circuit from the capacitor 50 to ground.

The normally opened contacts 72 are disposed in a parallel arrangement with the energizing contacts 64, wherein the normally opened contacts 72 will close during the operation of the drive relay 60 in circuit A. Accordingly, as mentioned above, when the energizing contacts 64 are opened, the normally opened contacts 72 which are now closed, will provide an alternate ground path for the relay coil 62 of the drive relay 60 so that the drive relay 60 will continue to be held in its energized condition and the tape recorder will continue to operate. The energizing path for the drive relay 60 now defines a circuit B as follows:

CIRCUIT B

Voltage source at terminal 30, line 44, resistor 46, line 54, relay coil 62 of drive relay 60, normally opened contacts 72 which are now closed, line 66, line 68, line 40 and ground terminal 42.

The above circuit B maintains the tape recorder in an operating condition wherein the drive relay 60 is now firmly operating. The method of releasing the drive relay 60 will now be described hereinafter below.

It is noted that during the period of time that the drive relay 60 is in an energized condition in circuit B, there is a voltage difference between points 80 and 90 disposed on opposite sides of the capacitor 50. This is due to the values of the resistor divider networks incorporated in the circuit of FIG. 2, defined by resistors 32, 46, and 56. The voltage drop across resistor 46 is proportional to the total voltage drop between the voltage source at terminal 30 and the ground terminal 42 in the same manner as the resistance of resistor 46 is proportional to the total resistance of the resistor 46 and the drive relay 60. Therefore, with a voltage source of −32 volts, the resistor 46 being 2200 ohms and the drive relay 60 being 1200 ohms, the voltage drop across the resistor 46 is approximately 21 volts. Therefore, point 90 is at −11 volts.

It is also seen that the voltage drop across the resistors 32 and 56 is equal to the voltage drop across the resistor 46. This voltage drop across the resistors 32, 56 is proportional to the voltage drop across the resistor 32 in the same manner as the sum of the resistance of resistors 32 and 56 is proportional to the resistance of the resistor 32. With the resistor 32 being 100k ohms and resistor 56 being 27k ohms, the voltage drop across the resistor 32 is approximately 16 volts. The voltage at 80 is the difference between the voltage drop across resistor 32 and the voltage source at terminal 30, which is therefore −16 volts.

The capacitor 50 will charge to the voltage differential between points 80 and 90, namely 5 volts. It is further noted, that the voltage across capacitor 50 is now positive at the capacitor terminal side connected to line 48. Therefore, the diode 70 is no longer conducting. Also the normally closed contacts 38 are still in the opened position, as set forth above.

When the foil sensing contact members 26 and 28 are bridged by the conductive foil 22 disposed on the tape loop 10, a ground potential is applied to the line 52, resulting in the application of the positive voltage at the capacitor 50 to the negative terminal of the relay coil 62. The drive relay 60, which is polarized as stated above, thus drops out causing the tape recorder to stop. The ground potential applied to the line 52 by the bridging of the foil sensing contact members 26 and 28, defines a circuit C as follows:

CIRCUIT C

Ground potential at terminal 42, line 74, foil sensing contact member 28, conductive foil 22, foil sensing contact member 26, line 76, line 34, line 52 and negative side of capacitor 50.

When the drive relay 60 drops out as stated above, circuit B is then opened, causing the normally opened contact 72 to again open. The capacitor 50 which has just discharged, is now again recharged to the 32 volts mentioned above, with the capacitor 50 being positive at its terminal side connected to line 52. This is accomplished in any one of two ways. The first is by imposing a voltage across the capacitor 50 through the electrical path mentioned above containing the normally closed contact 38, which is now in the closed position. The second is by imposing a voltage across the capacitor 50 through the electrical path defined by circuit C, when the conductive foil 22 is still engaged between the foil sensing contact members 26 and 28.

In view of the noted, description, it is apparent that even if the tape motion stalls so that the conductive foil 22 still remains sitting across the foil sensing contacts 26 and 28, the operation of the energizing contacts 64 will, nevertheless, function to energize the drive relay 60 in accordance with the circuit description of circuit A, as set forth above. It is noted that once the tape loop 10 starts to move and the electrical connection between the foil sensing contact members 26 and 28 is broken, the normally closed contacts 38 will still maintain the operating circuit path for the drive relay 60 until the normally closed contacts 38 are opened and electrically replaced by the diode 70 in the circuit A, as set forth herein above. The preceding electrical functions will be continuously repeated during the start and stop operations of the tape recorder.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. A circuit for a tape recorder arrangement receiving an endless tape loop provided with an electrically conductive foil disposed on a portion of the tape loop, said circuit comprising a capacitor, first means for providing said capacitor with a first charge, a relay coil of a polarized drive relay, said first charge being effective to apply a proper voltage polarity with respect to said relay coil of said polarized drive relay for energizing said relay coil, energizing means for causing said capacitor to discharge said first charge to energize said relay coil for starting operation of the tape recorder arrangement to drive the tape loop when said energizing means are actuated, second means for reversing polarity of said capacitor and providing said capacitor with a second charge during operation of the tape recorder arrangement, said second charge being effective to apply an opposite voltage polarity than said first charge with respect to said relay coil of said polarized drive relay for de-energizing said relay coil, foil sensing contact members disposed in proximity of the tape loop for engaging the conductive foil therebetween, said foil sensing contact members and engaged conductive foil defining electrical path means for causing said capacitor to discharge said second charge to de-energize said relay coil for stopping operation of the tape recorder arrangement.

2. A circuit according to claim 1, wherein normally opened contact members are disposed in a parallel arrangement with said energizing means to provide an alternate circuit path when said energizing means are in open position, said normally opened contact members being closed during operation of the tape recorder arrangements.

3. A circuit according to claim 1, wherein said second means includes a resistor divider network associated with said capacitor.

4. A circuit according to claim 1, wherein said electrical path means cooperates with said first means for providing said capacitor with said first charge when the tape recorder is in a stopped position with the conductive foil engaged between said foil sensing contact members.

5. A circuit according to claim 1, wherein said first means includes normally closed contact members associated with a voltage source.

6. A circuit according to claim 5, wherein said capacitor, said normally closed contact members, said energizing means and said relay coil define a series circuit to actuate said drive relay.

7. A circuit for a tape recorder arrangement receiving an endless tape loop provided with an electrically conductive foil disposed on a portion of the tape loop, said circuit comprising a capacitor, first means for providing said capacitor with a first charge, a relay coil of a polarized drive relay, energizing means for causing said capacitor to discharge said first charge to energize said relay coil for starting operation of the tape recorder arrangement to drive the tape loop when said energizing means are actuated, second means for providing said capacitor with a second charge during operation of the tape recorder arrangement, foil sensing contact members disposed in proximity of the tape loop for engaging the conductive foil therebetween, said foil sensing contact members and engaged conductive foil defining electrical path means for causing said capacitor to discharge said second charge to de-energize said relay coil for stopping operation of the tape recorder arrangement, said second means including a resistor divider network associated with said capacitor, said network including first, second and third resistors connected together in a series arrangement with said second resistor being disposed between said first and third resistors said first and third resistors being connected to a voltage source, said relay coil being connected to said series arrangement at a point between said first and second resistors, and said capacitor being disposed in a parallel arrangement with said second resistor to define a series connection including said first and third resistors and said capacitor.

8. A circuit for a tape recorder arrangement receiving an endless tape loop provided with an electrically conductive foil disposed on a portion of the tape loop; said circuit comprising a capacitor; first means for providing said capacitor with a first charge; a relay coil of a polarized drive relay; energizing means for causing said capacitor to discharge said first charge to energize said relay coil for starting operation of the tape recorder arrangement to drive the tape loop when said energizing means are actuated; second means for providing said capacitor with a second charge during operation of the tape recorder arrangement; foil sensing contact members disposed in proximity of the tape loop for engaging the conductive foil therebetween; said foil sensing contact members and engaged conductive foil defining electrical path means for causing said capacitor to discharge said second charge to de-energize said relay coil for stopping operation of the tape recorder arrangement; said first means including normally closed contact members associated with a voltage source; said capacitor, said normally closed contact members, said energizing means and said relay coil defining a series circuit to actuate said drive relay; and a diode disposed in a parallel arrangement with said normally closed contact members to provide an alternate circuit path when said normally closed contact members are in an open position.

9. A circuit according to claim 8, wherein normally opened contact members are disposed in a parallel arrangement with said energizing means to provide an alternate circuit path when said energizing means are in an open position, said normally opened contact members being closed during operation of the tape recorder arrangement.

10. A circuit according to claim 9, wherein said second means includes a resistor divider network associated with said capacitor.

11. A circuit according to claim 10, wherein said network includes first, second and third resistors connected together in a series arrangement with said second resistor being disposed between said first and third resistors, said first and third resistors being connected to said voltage source, said relay coil being connected to said series arrangement at a point between said first and second resistors, and said capacitor being disposed in a parallel arrangement with said second resistor to define a series connection including said first and third resistors and said capacitor.

* * * * *